(12) United States Patent
Taylor (10) Patent No.: US 7,856,571 B2
(45) Date of Patent: Dec. 21, 2010

(54) METHOD AND SYSTEM FOR COMMUNICATION EMPLOYING DUAL SLEW RATES

(75) Inventor: Gary L. Taylor, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 924 days.

(21) Appl. No.: 11/625,562

(22) Filed: Jan. 22, 2007

(65) Prior Publication Data

US 2008/0174339 A1 Jul. 24, 2008

(51) Int. Cl.
*G06F 1/00* (2006.01)
*G06F 13/00* (2006.01)

(52) U.S. Cl. ............... 713/600; 713/500; 710/104; 710/105

(58) Field of Classification Search ......... 713/400, 713/401, 500, 501, 600; 710/104, 105; 327/170; 318/597
See application file for complete search history.

(56) References Cited

U.S. PATENT DOCUMENTS

| | | | |
|---|---|---|---|
| 5,919,254 A | 7/1999 | Pawlowski | |
| 6,028,451 A * | 2/2000 | Ruff | 326/82 |
| 6,336,159 B1 | 1/2002 | MacWilliams | |
| 6,414,539 B1 * | 7/2002 | Srikanth et al. | 327/540 |
| 7,009,435 B2 | 3/2006 | Cho et al. | |
| 7,058,823 B2 * | 6/2006 | Lapidus | 713/300 |
| 2002/0101884 A1 * | 8/2002 | Pohlmeyer et al. | 370/509 |
| 2004/0064749 A1 * | 4/2004 | Grossnickle et al. | 713/400 |
| 2005/0200392 A1 | 9/2005 | Cho et al. | |
| 2006/0066373 A1 * | 3/2006 | Yang | 327/291 |

OTHER PUBLICATIONS

Intel, System Bus Overview, Intel Itanium 2 Processor Hardware Developer's Manual, p. 3-1, Jul. 2002

* cited by examiner

*Primary Examiner*—Mark Connolly (57) ABSTRACT

A bus for implementation with a computer system, as well as a computer processing device capable of interacting with such a bus, and a method of communicating signals over a bus, are disclosed. In at least one embodiment, the bus is a processor bus that includes a first processor bus portion that communicates first signals, and a second processor bus portion that communicates second signals at times determined independently of the first signals. The first and second signals respectively have first and second slew rates, the first and second slew rates being different from one another.

22 Claims, 3 Drawing Sheets

METHOD AND SYSTEM FOR COMMUNICATION EMPLOYING DUAL SLEW RATES

CROSS-REFERENCE TO RELATED APPLICATIONS

--

STATEMENT REGARDING FEDERALLY SPONSORED RESEARCH OR DEVELOPMENT

--

FIELD OF THE INVENTION

The present invention relates to methods and systems for communication among computer processing devices and/or other computer components and, more particularly, relates to methods and systems for communication among such devices/components as occurs on buses.

BACKGROUND OF THE INVENTION

Modern computer systems typically have one or more internal buses by which data can be communicated among different devices within the computer systems. For example, in computer systems based around the Itanium 2 microprocessor available from Intel Corporation of Santa Clara, Calif. (and co-developed by Intel with the Hewlett-Packard Company of Palo Alto, Calif.), a front side bus (FSB) allows for communication among several such microprocessors and/or possibly other devices including, for example, memory devices or input/output devices.

As the speeds of computer processing devices have continued to increase, it has become increasingly difficult for the transmission rates along the buses used in conjunction with those processing devices to keep up with the operational speeds of the processing devices. Consequently, buses such as the FSB have increasingly become bottlenecks limiting the performance of the overall computer systems. With respect to at least some types of buses, including the FSB, competing design considerations limit the degree to which transmission rates along the buses can be improved.

For example, the signals transmitted along buses such as the FSB include two major groupings of signals, source synchronous (SS) signals and common clock (CC) signals. Although transmitted along the same bus, SS signals tend to be more sensitive to electrical noise than CC signals and also tend to suffer more from reflections generated along the signal trace(s) than CC signals. Such concerns relating to the SS signals are typically mitigated by driving the signals on the FSB at a relatively low slew rate. Yet, because the signals on the FSB are driven at a low slew rate, higher data transmission rates that might otherwise be attainable through the use of CC signals driven at higher slew rates are precluded.

For at least the above reasons, it would be advantageous if an improved method and system for communicating signals in relation to computer systems could be developed. More particularly, it would be advantageous if an improved method and system could be achieved for communicating signals on buses (internal or otherwise) between computer components such as processors in a higher speed manner.

SUMMARY OF THE INVENTION

In at least some embodiments, the present invention relates to a processor bus for implementation with a computer system. The processor bus includes a first processor bus portion that communicates first signals, and a second processor bus portion that communicates second signals at times determined independently of the first signals. The first and second signals respectively have first and second slew rates, the first and second slew rates being different from one another.

Further, in at least some embodiments, the present invention relates to a computer processing device. The computer processing device includes a first port capable of communicating with a first portion of a bus, a second port capable of communicating with a second portion of the bus, and at least one additional component coupled to the first and second ports. First and second signals are communicated by way of the first and second ports, respectively, where the first and second signals have first and second slew rates, respectively, the first and second slew rates differing from one another. Also, the first and second slew rates are digitally programmed by way of the at least one additional component.

Additionally, the present invention in at least some embodiments relates to a method of communicating signals over a processor bus. The method includes providing first and second signals respectively having first and second slew rates onto first and second portions of the processor bus at a first location. Also, the method includes transmitting the first and second signals respectively along the first and second portions of the of the processor bus from the first location to the second location, and receiving the first and second signals off of the first and second portions of the processor bus at the second location, where the first and second slew rates differ from one another.

Further, in at least some embodiments, the present invention relates to a signal communication system that includes a uniform set of interconnects capable of communicating first and second signals, where the first and second signals have first and second slew rates, respectively, the first and second slew rates differing from one another.

DETAILED DESCRIPTION OF THE PREFERRED EMBODIMENT

Figure 1:
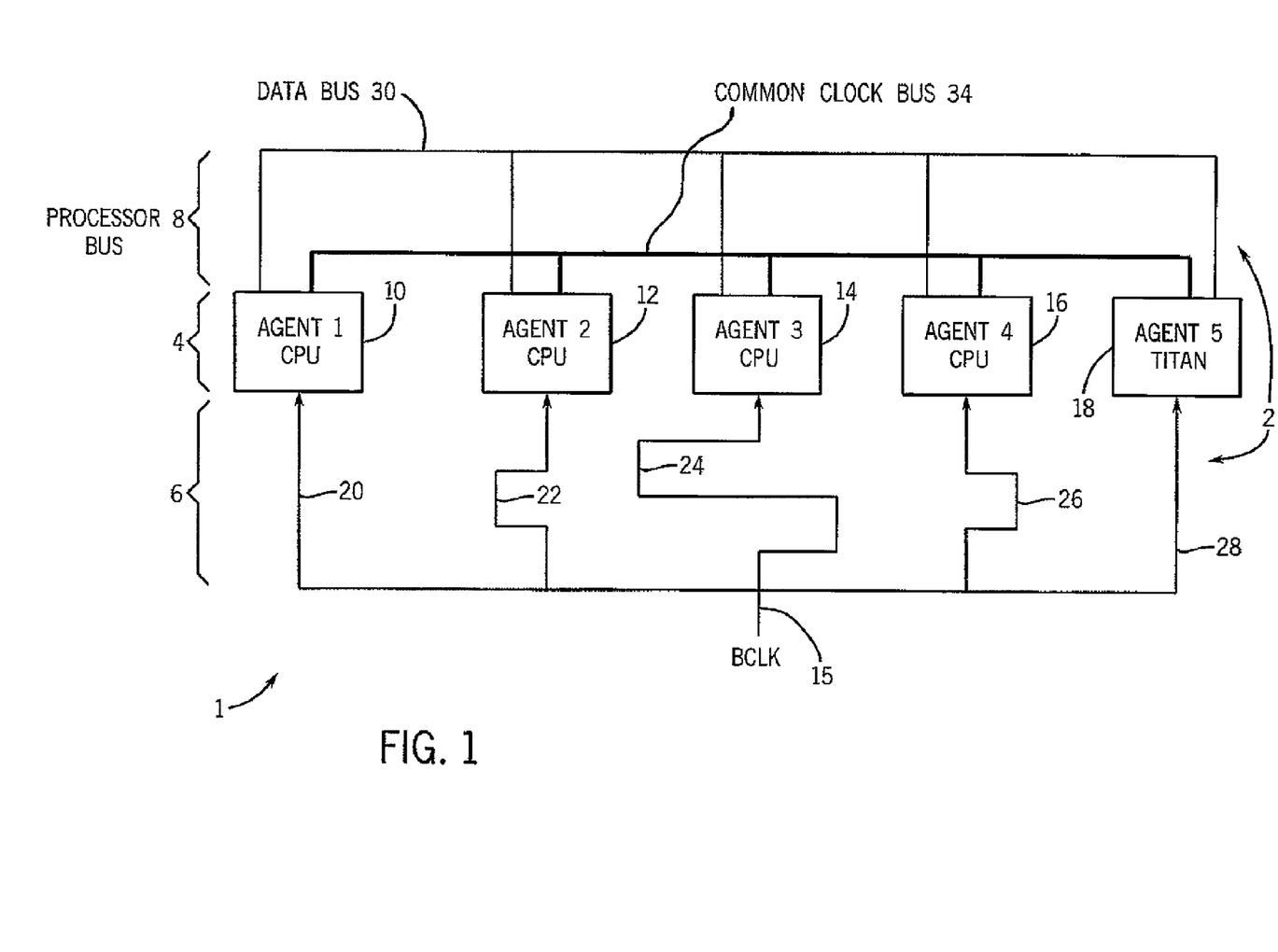
FIG. 1 is a block diagram illustrating in schematic form an exemplary bus implemented in an exemplary computer system having multiple processing devices, in accordance with at least one embodiment of the present invention.

FIG. 1 shows in simplified, schematic form components of an exemplary computer system 1 employing an exemplary bus that, in the present embodiment, is a multi-drop front side bus (FSB) 2. The FSB 2 is a collection of interconnects/wires that serve as a communication link (or links) by which information in the form of electrical signals can be transferred between/among multiple components, devices or sub-systems of the computer system 1. As shown, the FSB 2 includes both a system/bus clock (BCLK) 6 and a processor bus 8, which are described in further detail below. In addition to the FSB 2, the computer system 1 also includes multiple agents 4 that are linked to and in communication with one another by the FSB. The multiple agents 4 include four central processing units (CPUs) shown as first, second, third and fourth agents 10, 12, 14 and 16, respectively, and a super processor chipset shown as a fifth agent 18. Given that it links five of the agents 4, the FSB 2 can be considered a 5-drop FSB.

In the present embodiment, each of the agents 10, 12, 14 and 16 is an Itanium microprocessor as is available from Intel Corporation of Santa Clara, Calif. (also co-developed by the Hewlett-Packard Company of Palo Alto, Calif.). Relatedly, in the present embodiment, the FSB 2 (and particularly the processor bus 8 portion of the FSB) is a bus suitable for communication among the Itanium-based agents 10, 12, 14 and 16 and the fifth agent 18, e.g., a "McKinley bus". While in the present embodiment all of the four agents 10, 12, 14 and 16 are the same type of Itanium microprocessor, in alternate embodiments the agents can be a mix of different types. Additionally, in other alternate embodiments, one or more of the agents 10, 12, 14 and 16 can be a different type of processing unit other than an Itanium microprocessor, and the FSB 2 need not be a McKinley bus or be suited particularly for use with Itanium microprocessors.

As for the fifth agent 18 of FIG. 1, in the present embodiment this agent is an improved version of the Titan super processor chipset that is available from the Hewlett-Packard Company (modified as described below with respect to FIG. 3), and that is configured to communicate with each of the other agents 10, 12, 14 and 16 by way of the FSB 2. In alternate embodiments, the fifth agent 18 can take other forms. In at least some further embodiments, the fifth agent 18 need not be of a different type than the other agents 10, 12, 14, and 16. That is, while in the present embodiment one of the agents has different capabilities than the other agents, in other embodiments all of the agents can have the same capabilities, and/or there can be several groups of different types of agents.

Although not shown in FIG. 1, in addition to the FSB 2 and the agents 4, the computer system 1 also can be understood to include a memory controller and I/O subsystems, which are isolated from the agents 10, 12, 14 and 16 by the fifth agent 18 (for convenience, the memory controller and I/O subsystems can be considered as part of the fifth agent 18 shown in FIG. 1). The memory controller and I/O sub-systems are capable of sending information to, and receiving processed information from, the agents 10, 12, 14 and 16 via the fifth agent 18 and the FSB 2. Hence, the fifth agent 18 serves as each of a receiver for receiving signals from the other agents 10, 12, 14 and 16 off of the FSB 2, a transmitter for sending signals to the other agents 10, 12, 14 and 16 via the FSB, and an interface between the other agents 10, 12, 14 and 16 and other devices such as the memory controller and I/O subsystems of the computer system that are not directly coupled to the FSB themselves.

Although the present computer system 1 includes the four agents 10, 12, 14 and 16 that are CPUs and the fifth agent 18 that is a super processor chipset, this arrangement is only intended to be exemplary of a variety of computer systems having a variety of numbers and types of agents that are in communication with one another by way of a bus or other internal communication link. For example, in some alternate embodiments, the number of agents that are operating as CPUs can vary depending upon the chipset that is used. Further for example, while the Titan super processor chipset of the present embodiment communicates with four other agents, in some alternate embodiments the super processor chipset need only communicate with one, two or three other agents, or more than four other agents.

In the present embodiment of FIG. 1, the processor bus 8 constitutes a bi-directional bus, and each of the agents 10, 12, 14, 16 and 18 can communicate with one another by way of the processor bus. Most commonly, the communication of signals occurs between the fifth agent 18 and the first, second, third and/or fourth agents 10, 12, 14 and 16, albeit the agents 10, 12, 14 and 16 are likewise capable of communicating with one another. The processor bus 8 in particular allows two or more of the agents 10, 12, 14 and 16 to send signals simultaneously to the fifth agent 18. More particularly, due to the speeds of transmission of signals over the bus, and the physical dimensions of the bus (particularly the physical spacing of the agents 10, 12, 14, 16 and 18 along the bus), signals sent by the different agents 10, 12, 14 and 16 at the exact same time arrive at slightly different times at the fifth agent 18, such that the fifth agent is able to discern and receive all of the different signals from the different agents.

As shown in FIG. 1, the agents 10, 12, 14 and 16 are respectively physically located in a sequential manner at positions closer to the fifth agent 18 (e.g., the first agent 10 is physically farthest from the fifth agent while the fourth agent 16 is physically closest). Because of these different physical positions, the nearer a given one of the agents 10, 12, 14 and 16 is to the fifth agent 18, the sooner a signal sent from that agent at a given time will be received by the fifth agent (e.g., signals sent from the fourth agent 16 are received by the fifth agent 18 earlier in time than signals sent from the third agent 14, and so on). Likewise, signals sent from the fifth agent 18 to the respective agents 10, 12, 14 and 16 arrive sooner or later at those agents based upon the relative proximity of those agents to the fifth agent.

The speed of performance (particularly processing) of the computer system 1 depends upon both the FSB 2 and the agents 4. With respect to the FSB 2, the BCLK 6 in particular is the primary system clock signal, and is provided to each of the agents 4 independently (in a parallel manner). The BCLK 6 can be independently generated by a clock circuit (not shown) of the computer system 1, or provided as an input to the overall computer system. For simplicity of illustration, the BLCK 6 in FIG. 1 is merely represented as an input terminal 15 that is coupled to the respective agents 10, 12, 14, 16 and 18 by way of respective traces 20, 22, 24, 26 and 28, respectively. The frequency of the BCLK 6 can be, for example, 200 MHz, 267 MHz, 333 MHz or other (including even higher) frequencies.

The BLCK 6 provided to each of the agents 4 can be used by those agents in a variety of manners. For example, in the present embodiment, each of the agents 10, 12, 14 and 16 uses the BCLK 6 to generate its own respective internal clock signal for communicating with the super processor 18. Since the BCLK 6 in the present embodiment is used to coordinate the operation of the agents 4 in relation to one another, it is desirable that the BCLK signal provided at the input terminal 15 arrive at each of the agents 4 simultaneously. To ensure that the BCLK signal reaches each of the agents 10, 12, 14, 16 and 18 at the same time, the lengths of the respective traces 20, 22, 24, 26 and 28 from the input terminal 15 to the respective agents 4 is kept the same. That is, even though the respective agents 4 are at different physical distances from the input terminal 15, the trace lengths from that input terminal to each of the agents 10, 12, 14, 16 and 18 is identical (or substantially identical), As for the processor bus 8, that processor bus 8 is further divided into two subgroups based upon the function each sub-group performs, namely, a data bus 30 that transfers data, including strobe signals that serves as an additional clocks (e.g., in addition to the BCLK) that govern receipt of data transmitted via the data bus 30, and a common clock bus 34 that carries control and address signals. The data and common clock buses 30 and 34 vary in width/bandwidth but are uniform in length and topology. For example, the data bus 30 in the present embodiment includes 144 data and parity signals and 2 strobe signals for every 18 data/parity signals, while the common clock bus 34 consists of 120 signal lines to transfer address and control signals among the agents 10, 12, 14, 16 and 18.

In the present embodiment, each of the data bus 30 and the common clock bus 34 is bi-directional. Further as shown, in contrast to the manner in which the BCLK 6 is coupled to the agents 4, each of the buses 30 and 34 is connected to all of the agents 4 in a sequential (or serial) manner. That is, each of the buses 30 and 34 is respectively connected between the first agent 10 and the fifth agent, and also is connected, along the route between those two agents, to each of the other agents 12, 14 and 16 as well. This is not to say that any of the agents 12, 14 and 16 are interposed between the agents 10 and 18 such that signals must pass through those agents 12, 14 and 16 in order to proceed between the agents 10 and 18, but rather merely that each of the buses 30 and 34 is coupled to and accessible by each of the agents 12, 14 and 16 en route between the agents 10 and 18. Because of this sequential manner by which the buses 30 and 34 are linked to the agents 4, signals transmitted along the buses can suffer from some signal quality degradation due to reflections occurring at the agents to which the buses are connected.

To facilitate efficient communication between the CPU agents 10, 12, 14 and 16 and the super processor agent 18, the FSB 2 supports two types of signaling schemes: source synchronous data signaling and common clock signaling. The data bus 30 that transfers data between the CPU agents 10, 12, 14 and 16 and the super processor agent 18 operates with source synchronous signaling utilizing a source synchronous latched protocol. More particularly, according to this protocol, data is sent/received by way of the data bus 30 at a Double Data Rate (DDR) that is twice the frequency of the BCLK 6, which optimizes the performance of the data bus 30. When a given one of the agents 10, 12, 14 and 16 sends a data signal onto the data bus 30 for receipt by the fifth agent 18, or vice-versa, the sending agent also sends a strobe signal by way of the data bus. The strobe signal on the data bus 30 serves as an internal clock that synchronizes data transfer on the data bus at the receiver end. That is, upon receiving the strobe signal from the data bus 30, the receiving agent (e.g., any of the agents 10, 12, 14, 16 and/or 18) latches the data signals off the data bus 30.

In contrast to the data bus 30, the common clock bus 34 supports a common clock signaling scheme operating at the same frequency as the BCLK 6. The fifth agent 18 in particular is configured to latch signals off of the common clock bus 34, as provided by the other agents 10, 12, 14 and 16, whenever the fifth agent receives the BCLK 6. Likewise, the agents 10, 12, 14 and 16 are configured to latch signals off of the common clock bus 34, as provided by the fifth agent 18. The sending of signals from the agents 10, 12, 14, 16 and 18 onto the common clock bus 34 also is coordinated based upon their receipt of the BCLK 6. It should be further noted that, notwithstanding the above discussion, many aspects of the FSB 2 can vary depending upon the embodiment. For example, even though the present embodiment of the invention shows the data bus and common clock bus as having 144 data/parity plus 2 per 18 strobe and 120 signals respectively, these characteristics can vary in other embodiments.

Figure 2:
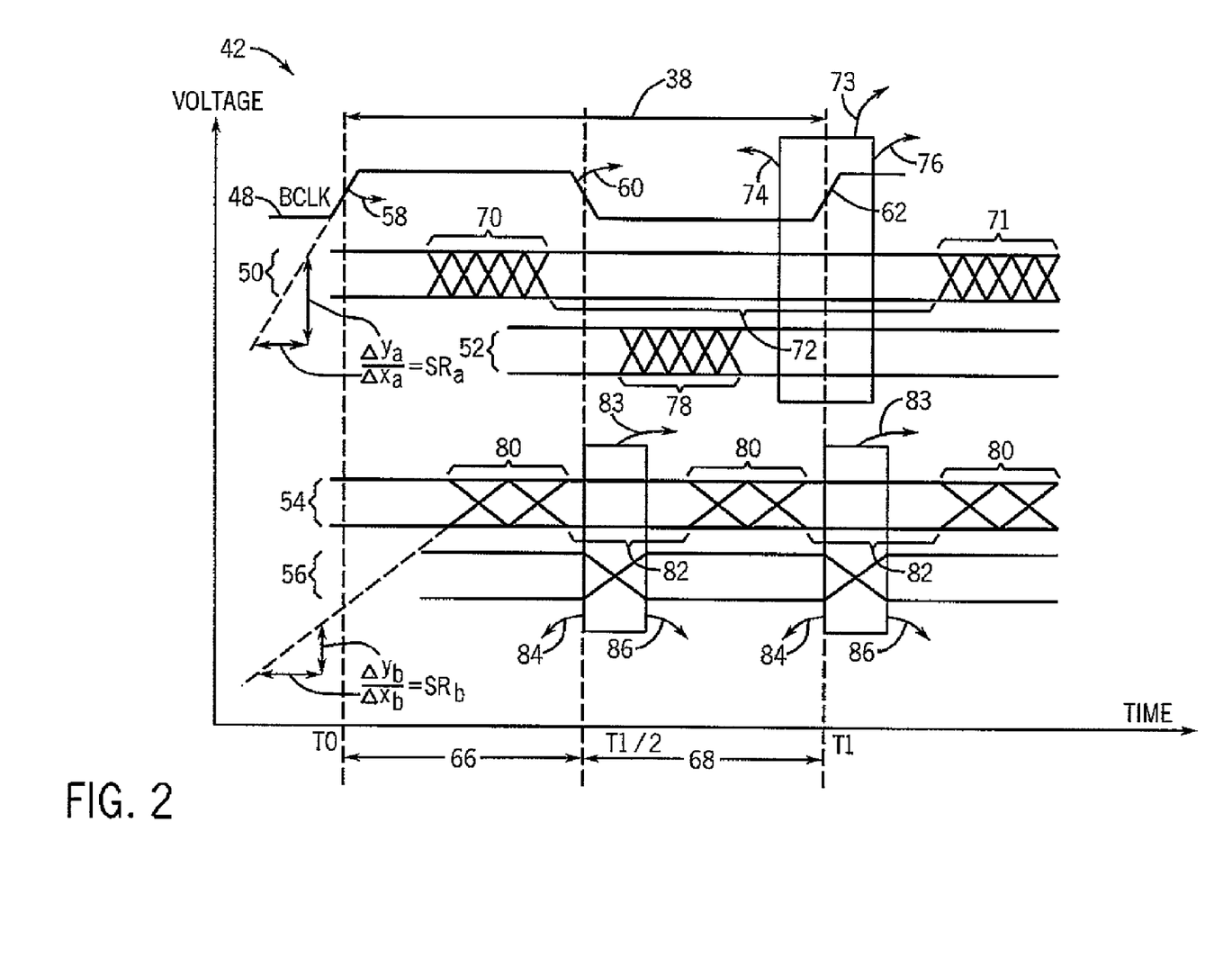
FIG. 2 is a timing diagram showing exemplary signals received via the bus of FIG. 1.

Turning to FIG. 2, an exemplary timing diagram 42 is provided showing exemplary signals that are transmitted on the FSB 2 in accordance with at least one embodiment of the present invention. The signals are shown as they would be observed by the first agent 10, when operating in a signal receiving mode of operation (albeit it is understood that the first agent can also transmit signals onto the FSB 2). As shown, a first of the signals is an exemplary periodic BCLK signal 48, as could be provided by the BCLK 6 to each of the agents 10, 12, 14, 16 and 18. Approximately (slightly more than) a single period or cycle 38 of the BCLK signal 48 is shown, albeit it will be understood that the BCLK signal can extend indefinitely in time. Based upon the BCLK signal 48, each of the agents 10, 12, 14, 16 and 18 is able to generate its own internal clock based upon which it interacts with the FSB 2.

In addition to the BCLK signal 48, FIG. 2 additionally shows first and second exemplary common clock signals 50 and 52, respectively, both of which are received by the first agent 18 off of the common clock bus 34. More particularly, the second exemplary common clock signal 52 is received by the first agent 18 from the fifth agent 18 that is farthest from the first agent. In contrast, the first exemplary common clock signal 50 is received by the first agent 10 from the second agent 12 that is closest to the first agent. Further, FIG. 2 also shows an exemplary source synchronous data signal 54 and strobe signal 56, both of which are received by the first agent 18 off of the data bus 30, and are provided from the fifth agent 18 that is farthest from the first agent.

In the present embodiment, the BCLK signal 48 has approximately a 50% duty cycle, insofar as it has a high output voltage (e.g., a voltage level 1) for approximately a time interval 66 constituting half of the period 38, from a time T0 until a later time T1/2, and a low output voltage (e.g., a voltage level 0) for approximately a remaining time interval 68 also constituting half of the period 38, from the time T1/2 to a time T1. The BCLK signal 48 also has "edges" that include a first rising edge 58, a falling edge 60, and a second rising edge 62 at the beginning, middle and end of the period 38, respectively (e.g., at the times T0, T1/2 and T1, respectively). Each of the rising edges 58, 62 represents a transition of the BCLK signal 48 from its low voltage level to its high voltage level, while the falling edge 60 represents a transition of the BCLK signal from its high level to its low level. The BCLK signal 48 maintains an essentially constant value (either at its low level or high level) in between the rising and falling edges 58, 60, 62. It will be understood that, although only the single period 38 of the BCLK signal 48 is shown in FIG. 2, the BCLK signal in additional cycles continues to have additional rising and falling edges. Also, the BCLK signal can take other forms in alternate embodiments (e.g., have a different periodicity or a duty cycle other than 50%).

With respect to the common clock signals 50 and 52 arriving at the first agent 10 from the second and fifth agents 12 and 18, respectively, each of these common clock signals operates at approximately half the frequency as the BCLK signal 48. More particularly, in the present embodiment, each of the second and fifth agents 12 and 18 is able to transmit signals onto the common clock bus 34 upon receiving one of the rising edges of the BCLK 48 (e.g., the rising edge 58). In the present embodiment, the second and fifth agents 12, 18 provide signals onto the common clock bus 34 by causing the signals to alternate in value from a high level to a low level, or vice-versa. The exact times at which the agents 12, 18 transmit (transition) the common clock signals 50, 52 in response to the BCLK signal 48 can vary somewhat based upon various operational circumstances. Consequently, signal transitions can occur at the agents 12, 18 within ranges of times subsequent to a given rising edge of the BCLK signal 48, and thus the common clock signals 50, 52 as experienced by the first agent 10 also can transition within ranges of times.

Thus, as shown in FIG. 2, the first and second common clock signals 50 and 52 in the present example each start out at either a high level or a low level (in FIG. 2, both possibilities are shown for each signal) at the time T0 when the first rising edge 58 of the BCLK signal 48 is provided to all of the agents 4 simultaneously. Either at the time T0, or at some time subsequent to the time T0, the second and fifth agents 12, 18 each exercise control over respective portions of the common clock bus 34 and are capable of causing respective transitions in the first and second common clock signals 50 and 52, such that the common clock signals switch from either a high level to a low level, or vice-versa (the two signals need not have the same value as one another at any given time).

Further as shown, the signal transitions caused by the respective second and fifth agents 12, 18 arrive at the first agent 10 as respective transitions in the first and second common clock signals 50, 52. The signal transitions arrive within respective ranges of times 70 and 78, since (as noted above), the second and fifth agents 12, 18 need not cause signal transitions immediately at the time T0. As shown, the range of time 78 within which the signal transition of the second common clock signal 52 arrives is delayed relative to the range of time within which the signal transition of the first common clock signal 50 arrives, since the second agent 12 is physically closer to the first agent 10 than the fifth agent 18. FIG. 2 in particular shows series of "Xs" within the time intervals 70,78, which are intended to represent a variety of different possible signal transitions that could be experienced by the common clock signals 50,52 during these time intervals, either from a high to low level or from a low to high level.

Although the second and fifth agents 12, 18 are allowed to cause signal transitions upon each rising edge of the BCLK signal 48, they are not allowed to cause more than one signal transition after any given rising edge. Rather, the common clock signals 50, 52 as determined by the second and fifth agents 12, 18 remain constant subsequent to each transition until at least the next rising edge of the BCLK signal 48 occurs. Thus, subsequent to the interval 70 during which the first common clock signal 50 experiences a transition, the first common clock signal then remains constant during a time interval 72, after which eventually occurs another time interval 71 during which that common clock signal can again experience a transition (again, a series of "Xs" appears within the time interval 71 illustrating various possible transitions). Similarly, subsequent to the interval 78 during which the second common clock signal 52 experiences a transition, the second common clock signal then remains constant (again up until a later time interval during which that common clock signal can experience another transition.

Although FIG. 2 shows only the first and second common clock signals 50, 52, it will be understood that similar common clock signals can be provided by each of the agents 4 (e.g., including the third and fourth agents 14, 16) onto the common clock bus 34 for receipt by the first agent 18. Just as transitions of the second common clock signal 52 occur within time intervals that are staggered relative to other time intervals within which transitions of the first common clock signal 50 occur, other common clock signals provided by the other agents 14, 16 will also transition within time intervals that are positioned intermediate between the time intervals 70, 78 at which the transitions of the first and second common clock signals 50, 52 occur. Although the time intervals 70, 78 of FIG. 2 do not at all overlap, it is possible that those time intervals can overlap the time intervals during which signal transitions provided by the third and fourth agents 14, 16 arrive at the first agent 10.

Although the common clock signals 50, 52 provided by the agents 12, 18 (as well as any other common clock signals provided by the agents 14, 16) occur within somewhat different time intervals, the first agent 10 is configured to receive/ accept all of the signal transitions experienced by all of the common clock signals in response to a given edge of the BCLK signal 48 within a single time range or window 73. In order for this to be possible, it is necessary that all of the signal transitions occurring within all of the common clock signals 50, 52 provided to the first agent 10 be completed by an edge 74 at which the window 73 begins, and that no new signal transitions in the common clock signals begin to occur until after a final edge 76 of the window 73 has passed. This is shown to be the case in the present example, since the time interval 70 associated with the signal transitioning of the first common clock signal 50 has long been completed by the time of the edge 74, and the time interval 71 does not begin until after the final edge 76. Likewise, the time interval 78 associated with the signal transitioning of the second common clock signal is completed before the edge 74, but no new signal transitioning of that common clock signal occurs prior to the edge 76.

The window 73 is the time interval during which the first agent 10 samples all the information on the common clock bus 34 sent by the second, third, fourth and fifth agents 12, 14, 16 and 18 in response to the previous rising edge of the BCLK signal 48 (e.g., the rising edge 58). In the present embodiment, the window 73 is timed so that the next the next rising edge subsequent to the rising edge that gave rise to the transitions in the common clock signals (e.g., the rising edge 62) occurs during the window. The edge 74 of the window 73 in particular constitutes a setup time by which a signal transition must have arrived at the first agent 10 (e.g., the receiver end) for the information to be correctly sampled by that agent. Additionally, in the present embodiment, data from the common clock signals 50, 52 must remain valid after the current rising edge (e.g., the rising edge 62) overlapping the window 73 for at least the hold time of the BCLK signal 48, in order for that data to be sampled correctly by the first agent 10 without being garbled. Hence, the values of the common clocks signals 50, 52 must remain constant throughout the entire window 73, up until the final edge 76, and the window can be considered a sample and hold window. After the final edge 76 of the window 73 has passed, the common clock signals again can transition.

With respect to the source synchronous data signal 54 and strobe signal 56 provided by the data bus 30 for receipt by the first agent 10, in the present example these signals are each provided by the fifth agent 18 that is physically farthest from the first agent 10, with FIG. 2 showing how those signals appear to that first agent. Nevertheless, it should be understood that similar signals can be received by the first agent 10 from any of the other agents 12, 14 and 16. Indeed, it is possible that common clock signals, source synchronous data signals and strobe signals can be sent from any one of the agents 10, 12, 14, 16 and 18 to any one or more of those agents. At the same time, typically it is the case that such signals are communicated between the fifth agent 18 and each of the other agents 10, 12, 14 and 16.

As is evident from FIG. 2, the data bus 30 (in contrast to the common clock signals 50, 52 discussed above) operates at twice the frequency of the BCLK signal 48, that is, data can be driven onto the data bus 30 by the fifth agent 18 at both rising and falling edges of the BCLK 48. The strobe signal 56 is a clock signal that is internally generated by the fifth agent 18 based upon the BCLK signal 48. The first agent 10 determines when it should attempt to capture data from the data bus 30 based upon the strobe signal 56. Further as illustrated, in the present embodiment, the fifth agent 18 is capable of sending the source synchronous data signal 54 (e.g., by transitioning the level of that signal) two times in given period of the BCLK signal 48 such as the period 38, both in response to the rising edges 58, 62 and in response to the falling edge 60 of the BCLK signal.

As was the case with the common clock signals 50, 52, FIG. 2 is intended to show that each of the source synchronous data signal 54 and the strobe signal 56 can take on either a high level or a low level at any given time. Also, as was the case with the signal transitions of the common clock signals 50, 52, the signal transitions of the source synchronous data signal 54 arrive at the first agent 10 within time intervals 80, and the source synchronous data signal remains constant in value during other time intervals 81 in between the time intervals 80. The strobes are pairs of pseudo-differential signals, each of which is also capable of transitioning two times during a given period of the BCLK signal 48.

Additionally, as was the case with the common clock signals 50, 52, the first agent 10 is configured to accept/receive signals arriving off the data bus 30 only within particular time windows 83, which in the present embodiment are determined by and coordinated with the transitions in the strobe signal 56. To be properly received, the signal transitions of the source synchronous data signal 54 on the data bus 30 must be received by the first agent 10 by the setup times of the strobe signal 56, represented by the initial edges 84 of the windows 83, and the source synchronous data signal must remain constant until after sufficient hold time has passed, that is, until after passage of the final edges 86 of the windows. In the present embodiment, the timing of the strobe signal 56 is not related in any particular manner to the timing of the BCLK signal 48.

While in the present example of FIG. 2 it is the fifth agent 18 that is exercising control over the strobe signals, control over the strobe signals at any given time is allocated to that one of the agents 10, 12, 14, 16, and 18 that is currently transmitting (or has just transmitted) signals over the data bus 30. As the identity of the agent sending data over the data bus 30 changes over time, control over the strobe signals is repeatedly transitioned among the different agents 10, 12, 14, 16 and 18.

Although FIG. 2 shows exemplary timing characteristics of the strobe signal 56 and the source synchronous data signal 54, these timing characteristics are dependent upon the relative proximity of the fifth agent 18 to the first agent 10 as well as other aspects of the operation of the fifth agent. Thus, in alternate embodiments, the timing of the signals provided via the data bus 30 need not be (and typically will not be) the same as that shown in FIG. 2. Indeed, all of the timing diagrams of FIG. 2, including those showing the common clock signals 50, 52 and the BCLK signal 48, are intended merely as examples, and it should be understood that various signal characteristics shown in FIG. 2 will vary depending upon the embodiment including, for example, the time intervals 70-72, 78, 80 and 82 and temporal lengths of the windows 73, 83, the duty cycles of the various signals, and the frequencies of the various signals.

Because the strobe signal 56 is used by the first agent 10 to determine when it is appropriate to attempt to capture data on the data bus 30, it is desirable that the strobe signal 56 be protected from excessive noise and reflections to ensure that the data on the data bus is properly sampled at the receiving end. Yet each of the agents 10, 12, 14, 16 and 18 forms a stub on the processor bus 8, and particularly on the data bus 30, with the stubs in particular constituting the off-shoots of the processor bus 8 that extend through the socket and package and up onto the dies of the respective agents. These stubs cause reflections and noise, which in turn increase crosstalk and electromagnetic interference (EMI) on the data bus 30 and potentially cause degradation in the quality of the signals on the data bus, particularly the strobe signal 56. As a result, in the absence of any mechanism or process for minimizing these stub reflections and/or their effects, the stub reflections can trigger improper operation on the part of the first agent 10, particularly when it attempts to receive signals off of the data bus 30, such that improper information is communicated to the first agent.

More particularly, the reflections and related signal degradation arising on the data bus 30 (and particularly those reflections affecting the strobe signal 56) due to the stubs is associated with the slew rate of the strobe signal 56. The slew rate for a signal represents how quickly an electrical signal can transition from one level to another level or from close to one level to close to another level, for example, from 20% to 80% of the difference between the two signal levels, or from 10% to 90% of the difference between the two levels. Slew rate typically is measured in volts per second or volts per time unit. Often, the slope of a signal transition between two levels is equal to or representative of that signal's slew rate. Typically, to drive signals at a faster rate, a higher slew rate is desired. In the present embodiment of FIG. 2, the common clock signals 50,52 benefit by being driven at relatively high slew rates/speeds, insofar as this reduces the drive time of the signals and increases overall data throughput. However, as already mentioned, such high slew rates can degrade performance of a signal, which is particularly of concern in relation to the communication of the strobe signal 56 and consequent operation of the receiving agent in relation to the data bus 30.

To eliminate (or at least significantly limit) any negative consequences associated with such stub reflections, in accordance with the present embodiment of the invention, the slew rates of the source synchronous data signal 54 and strobe signal 56 are different from the slew rates of the common clock signals 50,52. As shown in FIG. 2, the BCLK signal 48 and the common clock signals 50,52 share in common a first slew rate $SR_a$ that is equal to the magnitude of the slope of the rising and falling edges 58,60,62 of the BCLK signal 48 (e.g., $SR_a=|\Delta y_a/\Delta x_a|$). In contrast, the source synchronous signal 54 and strobe signal 56 have a second slew rate $SR_b$ that is equal to the magnitude of the slope of the rising and falling edges of those signals as shown (e.g., $SR_b=|\Delta y_b/\Delta x_b|$)

More particularly, in the present embodiment, the first slew rate $SR_a$ of the common clock signals 50,52 has a larger, steeper slope than the second slew rate $SR_b$ of the source synchronous data signal 54 and the strobe signal 56. This difference in the slew rate of the common clock signals 50,52 relative to the slew rate of the source synchronous data signal 54 and strobe signal 56 is also evident from the relative widths of the "Xs" shown in FIG. 2 that represent potential transitions occurring in those signals during the time intervals/windows 70, 71, 78, 80 and 83 (namely, the width of the "Xs" of the common clock signals 50,52 shown at the time intervals 70,71,78 is narrower than that of the "Xs" of the data and strobe signals 54,56 shown at the time intervals/windows 80,83).

The above-described difference between the slew rates $SR_a$ and $SR_b$ is advantageous because it eliminates the need to choose between enhanced levels of throughput by way of the common clock signals 50,52 and enhanced quality and reliability of the strobe signal 56 (and associated proper data transmission to the fifth agent 18 via the data bus 30). Rather, the use of two different slew rates makes it possible to achieve both goals simultaneously. That is, the higher slew rate $SR_a$ of the common clock signals 50,52 allows for enhanced rates of data throughput via the common clock bus 34, while the lower slew rate $SR_b$ results in less reflections, noise and consequent signal deterioration with respect to the strobe signal 56 communicated via the data bus 30, and thus enhanced (e.g., more reliable) transmission of information by way of the data bus 30. Thus, by independently specifying the slew rates for the different types of signals on the FSB 2, the electrical performance including signal speed and integrity of each signal type can be optimized, such that both the performance of the FSB and the performance of the overall computer system 1 can be enhanced.

Depending upon the embodiment, the relative values of, and difference between, the slew rate of the BCLK signal 48 and common clock signals 50,52 and the slew rate of the source synchronous data signal 54 and strobe signal 56 can vary significantly from the exemplary slew rates shown in FIG. 2. While in the present embodiment the BCLK signal 48 and common clock signals 50,52 share the same slew rate $SR_a$, and while the data and strobe signals 54,56 share the same slew rate $SR_b$, in alternate embodiments, there can be more than two slew rates that are applicable with respect to these different types of signals, or even each of these different types of signals can have a different slew rate (for example, in alternate embodiments, the slew rate $SR_a$ of the common clock signals 50,52 need not be the same as that of the BCLK signal 48). Also, in at least some embodiments, it is possible to vary the different slew rates that are being employed in relation to the BCLK, common clock, data and strobe signals 48-56. Variation in the slew rates can be performed either when the computer system 1 is off-line or even during operation of the computer system, e.g., in real-time depending upon operational circumstances.

Figure 3:
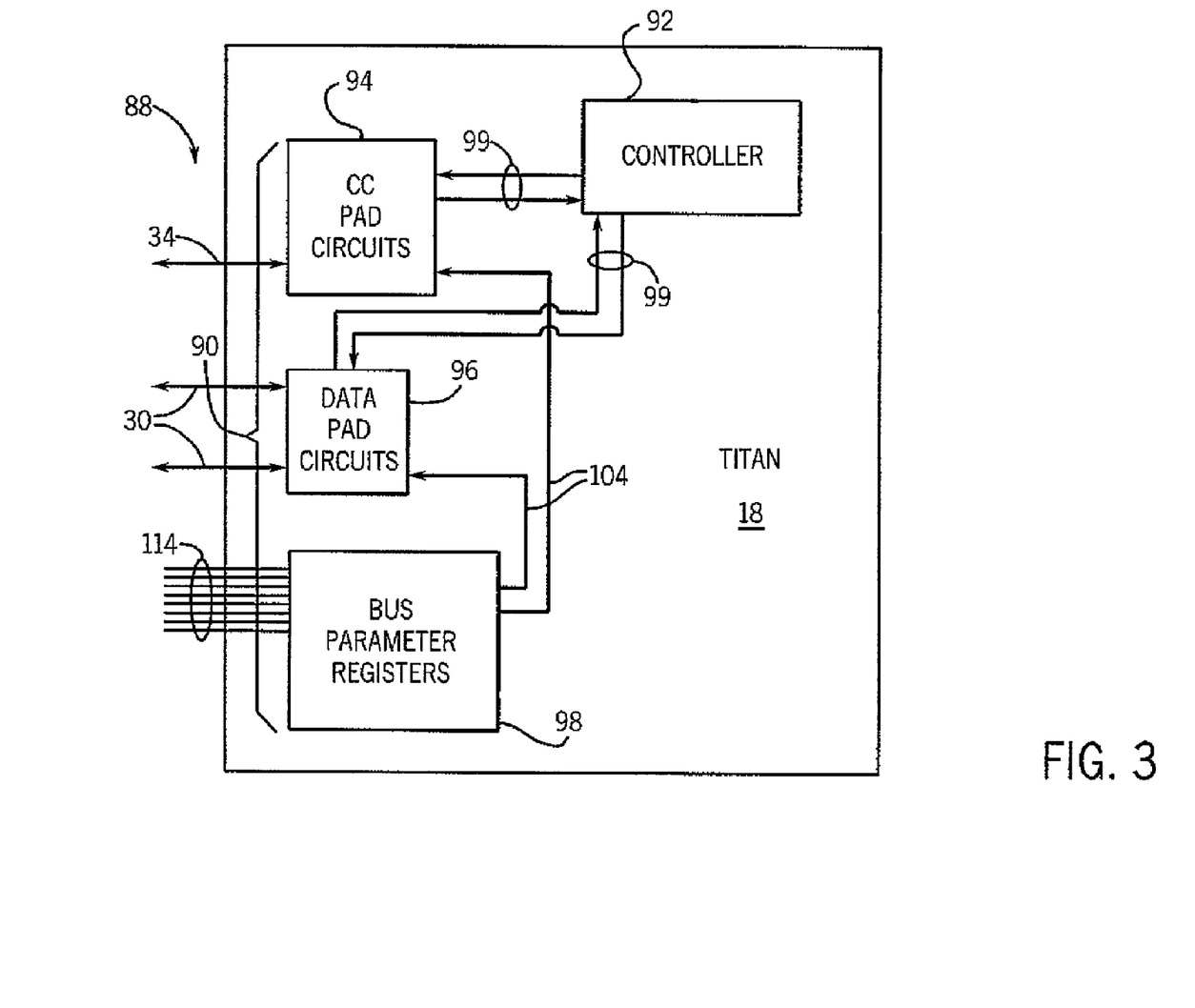
FIG. 3 is a block diagram illustrating in schematic form components of an exemplary bus interface capable of being implemented in one or more of the processing devices of FIG. 1.

Turning to FIG. 3, several internal components of the fifth agent 18 of the computer system 1 are shown in simplified form. While the FSB 2 can be formed from conventional electrical components as discussed above, the fifth agent 18 of the computer system 1 is a Titan super processor chipset that is modified to facilitate the setting and updating of multiple slew rates for use on the FSB 2. As shown, the fifth agent 18 in particular includes an improved Titan processor bus interface 88 including various pad circuits 90 and a controller 92. The bus interface 88, by way of the pad circuits 90, allows connection of the fifth agent 18 to each of the data bus 30 and the common clock bus 34. Thus, by virtue of the bus interface 88, the fifth agent 18 receives information off of each of the buses 30 and 34, and distributes that information to the remainder of the fifth agent 18, which in turn is capable of providing that information to the memory controller and I/O sub-systems (not shown).

As shown, the pad circuits 90 are further divided into common clock (CC) pad circuits 94, data pad circuits 96 and on-chip bus parameter registers 98. The CC pad circuits 94 are in communication with the common clock bus 34, while the data pad circuits 96 are in communication with the data bus 30. Also, each of the CC pad circuits 94 and the data pad circuits 96 are linked by way of communication links 99 to the controller 92, which implements core logic by which it governs the operation of those pad circuits 94, 96. The controller 92 in particular is configured to implement the processor bus protocol by utilizing all bus signals to receive and transmit control and address and data information on the bus 34 and 30.

The communication links 99 include clock signals which control the timing of the CC pad circuits 94 and data pad circuits 96. Thus, the CC pad circuits 94 receive and send common clock signals such as the signals 50 and 52 of FIG. 2 in relation to the common clock bus 34, by which those signals are received from or sent to the agents 10, 12, 14 and 16. Similarly, the data pad circuits 96 receive and send source synchronous data signals and strobe signals such as the signals 54 and 56 of FIG. 2 in relation to the data bus 30, by which those signals are received from or sent to the agents 10, 12, 14 and 16. It should be understood that, although not shown, the controller 92 is in communication with other components of the fifth agent 18 (e.g., a port receiving the BCLK signal 48) by way of links other than the communication links 99.

As for the on-chip bus parameter registers 98, these provide bus parameter signals 104 to the CC pad circuits 94 and data pad circuits 96. By virtue of providing the signals 104, the registers 98 control the rise and fall times of the common clock, data and strobe signals transmitted by the CC pad circuits and data pad circuits and, hence, the slew rates of those signals. More particularly, since the CC pad circuits 94 are distinct from the data pad circuits 96, and since the signal 104 provided to the CC pad circuits is distinct from the signal 104 provided to the data pad circuits, the bus parameter registers 98 are capable of controlling/setting the slew rates of the common clock signals and the data/strobe signals independently of one another. That is, different parameters can be set for both common clock and data/strobe signals, such that different rise and fall times and slew rates for these different signals are digitally programmable.

In the present embodiment, the bus parameters of the bus parameter registers 98 can be set by way of a set of eight DC program pads 114, which are coupled to the registers 98 (depending upon the embodiment, the pads 114 need not be eight in number, and can take a variety of forms allowing for the input of bus parameter information). The initial bus parameters set by way of the pads 114 can later be overwritten by software writing to the bus parameter registers, for example, in response to commands provided from one or more CPUs. Notwithstanding the setting of the bus parameter registers 98 by way of the pads 114 in the present embodiment, in alternate embodiments the bus parameters can be set using other mechanisms, even by remote control (e.g., by instruction from a remote location via the internet and/or a wireless communication device, etc.).

Upon receiving bus parameters from the bus parameter registers 98, the CC pad circuits and/or data pad circuits 96 cause signal transitions in the common clock, data and strobe signals that reflect the specified slew rates. Commonly this is achieved by dividing the overall signal transition (e.g., the change in voltage from a high level to a low level or vice-versa) by a discrete number corresponding to the specified slew rate to calculate a standard voltage step and then, when performing a signal transition, increasing or decreasing the voltage by the amount of the voltage step on a repeated number of occasions corresponding to the discrete number. In at least one embodiment, the bus parameter registers 98 include two different digitally settable/programmable 3-bit binary fields to independently control the slew rates of the common clock signals and source synchronous data/strobe signals as set by the respective pad circuits 94 and 96.

Although the two fields respectively associated with the respective sets of pad circuits 94 and 96 are independent of one another, in at least the present embodiment each of the fields can be specified with a slew rate value selected from the same slew rate table or slew rate choices. Table 1 shows one exemplary slew rate table from which both of the slew rate settings can be selected. In this table, "SLEW" is the 3-bit field of the register that controls the slew rate of the pad circuits. With respect to the other column headings, the Mhz number is the FSB or BCLK operating frequency, which affects the slew rate by virtue of how slew rate is implemented. This frequency is the same for both the common clock and the source synchronous data/strobe signals.

Additionally, the terms "@5s" and "@10s" in Table 1 respectively refer to "5-stage driver" or "10-stage driver", and represent a selectable input indicating whether the slew is to be accomplished in 5 discrete voltage steps or 10 discrete voltage steps. Depending upon whether @5s or @10s is selected/specified, a particular value of slew rate will be doubled or not doubled. In the present embodiment, the selection of @5s or @10s is another bit in the bus parameter registers (thus resulting in two separate bits for the common clock and source synchronous data/strobe signals). Finally, as also indicated, the slew rate values in Table 1 are in Volts/nanosecond (V/ns). Blank entries within the table are disallowed combinations.

TABLE 1

| SLEW | 200 MHz V/ns@5s | 200 Mhz V/ns@10s | 267 Mhz V/ns@5s | 267 Mhz V/ns@10s | 333 Mhz V/ns@5s | 333 Mhz V/ns@10s |
|---|---|---|---|---|---|---|
| 000 |  |  |  |  | 1.0 | 0.5 |
| 001 |  |  | 1.1 | 0.5 | 1.3 | 0.6 |
| 010 |  |  | 1.2 | 0.6 | 1.5 | 0.7 |
| 011 | 1.0 | 0.5 | 1.3 | 0.7 | 1.7 | 0.8 |
| 100 | 1.2 | 0.6 | 1.6 | 0.8 | 2.1 | 1.0 |
| 101 | 1.4 | 0.7 | 1.9 | 1.0 | 2.4 | 1.2 |
| 110 | 1.8 | 0.9 | 2.4 | 1.2 |  |  |
| 111 | 2.3 | 1.2 |  |  |  |  |

Although, the above description provide some exemplary methods and systems allowing for enhanced operation of a bus such as the FSB 2 through the use of multiple slew rates, which in at least some embodiments are independently and dynamically alterable, the present invention is also intended to encompass a variety of other processes and systems, including modifications and/or refinements to the above described methods and systems, allowing for multiple and/or variable slew rates to be applied to different signal types. The bus/FSB configuration, agents 10-18 and other aspects of the computer system 1 can be varied from those described above depending upon the type/needs of the computer system being used. While in some embodiments of the present invention, two slew rates are employed (one for the common clock signals and one for the source synchronous data signals and the strobe signals), in other embodiments only the strobe signal differs in terms of its slew rate from each of the other types of signals, or alternatively, three or more different slew rates can be employed. The present invention is intended to be applicable with respect to a wide variety of different types of buses and similar networks or communication links, both internal to computer systems as well as external thereof.

It is specifically intended that the present invention not be limited to the embodiments and illustrations contained herein, but include modified forms of those embodiments including portions of the embodiments and combinations of elements of different embodiments as come within the scope of the following claims.

I claim:

1. A processor bus for implementation with a computer system, the processor bus comprising:
a first processor bus portion that communicates first signals; and
a second processor bus portion that communicates second signals at times determined independently of the first signals,
wherein the first and second signals respectively have first and second slew rates, the first and second slew rates being different from one another.

2. The processor bus of claim 1, wherein the processor bus is either internal to a computer system or external to the computer system, wherein the processor bus is bi-directional, and wherein the first slew rate is greater than the second slew rate.

3. The processor bus of claim 1, wherein the first signals are common clock signals.

4. The processor bus of claim 1, wherein the second signals include source synchronous data signals.

5. The processor bus of claim 1, wherein the second signals are transmitted in a source synchronous manner.

6. The processor bus of claim 5, wherein the second processor bus portion includes both a source synchronous data bus portion and a strobe portion, and wherein the second signals include data signals and strobe signals that are respectively communicated by way of the source synchronous data bus portion and the strobe portion, respectively.

7. The processor bus of claim 1, wherein the processor bus includes a third processor bus portion, wherein the second signals are strobe signals, wherein the third processor bus portion communicates third signals that are data signals, and wherein each of the second and third signals shares the second slew rate.

8. The processor bus of claim 7, wherein the processor bus is a multi-drop front side processor bus capable of communicating the signals among at least two processing devices, and wherein the first signals include at least one of address information and/or control information.

9. A computer system comprising the processor bus of claim 1, and further comprising:
a chipset capable of serving as an interface between the processor bus and at least one of a memory controller and an input/output (I/O) subsystem; and
at least one additional processing device.

10. The computer system of claim 9, wherein the at least one additional processing device includes a plurality of microprocessors, each of which is capable of sending signals over the bus for receipt by the chipset.

11. The computer system of claim 9, wherein the chipset is digitally programmable so as to determine the first and slew rates.

12. A computer processing device comprising:
a first port capable of communicating with a first portion of a bus;
a second port capable of communicating with a second portion of the bus; and
at least one additional component coupled to the first and second ports,
wherein first and second signals are communicated by way of the first and second ports, respectively,
wherein the first and second signals have first and second slew rates, respectively, the first and second slew rates differing from one another, and
wherein the first and second slew rates are digitally programmed by way of the at least one additional component.

13. The computer processing device of claim 12, wherein the at least one additional component includes a control register that provides bus parameters that in turn determine the slew rates, wherein the bus parameters of the control register can be set in response to one or more input signals or in response to one or more software instructions.

14. The computer processing device of claim 12, wherein the second port is capable of communicating with both a data bus portion of the bus and a strobe portion of the bus.

15. A computer system comprising the computer processing device of claim 12, and further comprising a bus having the first and second portions, wherein the first portion transmits common clock data signals and the second portion transmits both source synchronous data signals and strobe signals.

16. The computer system of claim 15, wherein the bus is a processor bus, and further comprising:
    a plurality of additional processing devices that are coupled by way of the bus to the first and second ports of the computer processing device; and
    a source of clock signals that are respectively provided to the additional processing devices and to the computer processing device, wherein respective connections linking the source to each of the respective processing devices have respective lengths that result in the all of the common clock signals reaching all of the processing devices at substantially identical times, assuming that all of the common clock signals emanate from the source at a given time.

17. A method of communicating signals over a processor bus, the method comprising:
    providing first and second signals respectively having first and second slew rates onto first and second portions of the processor bus at a first location;
    transmitting the first and second signals respectively along the first and second portions of the of the processor bus from the first location to a second location; and
    receiving the first and second signals off of the first and second portions of the processor bus at the second location,
    wherein the first and second slew rates differ from one another.

18. The method of claim 17, further comprising:
    providing a third signal having the second slew rate onto a third portion of the processor bus at the first location, transmitting the third signal along the third portion of the processor bus from the first location to the second location, and receiving the third signal off of the third portion of the processor bus at the second location, wherein the receiving of the second signal is governed at least in part by the receiving of the third signal.

19. The method of claim 18, wherein the third signal is a strobe signal, the second signal is a source synchronous data signal, and the first signal is a common clock data signal, and further comprising providing a fourth signal to each of a first processing device coupled to the first location and a second processing device coupled to the second location, the fourth signal being a bus clock signal.

20. The method of claim 17, generating signals determinative of the slew rates and providing the signals respectively to common clock pad circuits and data pad circuits of a chip, whereby the slew rates of the first and second signals are determined.

21. A signal communication system comprising:
    a uniform set of interconnects capable of communicating first and second signals;
    means for providing the first and second signals respectively onto first and second portions of a processor bus at a first location;
    means for transmitting the first and second signals respectively along the first and second portions of the of the processor bus from the first location to a second location; and
    means for receiving the first and second signals off of the first and second portions of the processor bus at the second location,
    wherein the first and second signals have first and second slew rates, respectively, the first and second slew rates differing from one another.

22. The system of claim 21, comprising:
    means for digitally programming the slew rates of the first and second signals.

* * * * *

UNITED STATES PATENT AND TRADEMARK OFFICE
CERTIFICATE OF CORRECTION

PATENT NO. : 7,856,571 B2
APPLICATION NO. : 11/625562
DATED : December 21, 2010
INVENTOR(S) : Gary L. Taylor It is certified that error appears in the above-identified patent and that said Letters Patent is hereby corrected as shown below:

In column 14, line 44, in Claim 11, delete "slew" and insert -- second slew --, therefor.

In column 15, line 29, in Claim 17, before "processor" delete "of the".

In column 16, lines 26-27, in Claim 21, before "processor" delete "of the".

Signed and Sealed this
Twelfth Day of April, 2011

David J. Kappos
*Director of the United States Patent and Trademark Office*